(12) United States Patent
Yasuda

(10) Patent No.: US 6,765,225 B2
(45) Date of Patent: Jul. 20, 2004

(54) RADIATION IMAGE INFORMATION READING APPARATUS

(75) Inventor: Hiroaki Yasuda, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 221 days.

(21) Appl. No.: 09/986,152

(22) Filed: Nov. 7, 2001

(65) Prior Publication Data
US 2002/0053649 A1 May 9, 2002

(30) Foreign Application Priority Data

Nov. 7, 2000 (JP) ........................................ 2000/338448

(51) Int. Cl.⁷ .............................................. G03B 42/08
(52) U.S. Cl. ...................................... 250/586; 250/584
(58) Field of Search ................................ 250/581, 582, 250/584, 586, 587

(56) References Cited

U.S. PATENT DOCUMENTS

| 4,258,264 A | 3/1981 | Kotera et al. ................ 250/484 |
| 4,276,473 A | 6/1981 | Kato et al. ................ 250/327.1 |
| 4,387,428 A | 6/1983 | Ishida et al. ................ 364/414 |
| 4,816,679 A | 3/1989 | Sunagawa et al. ....... 250/327.2 |
| 4,922,103 A | 5/1990 | Kawajiri et al. .......... 250/327.2 |
| 5,832,055 A | * 11/1998 | Dewaele ..................... 378/62 |

FOREIGN PATENT DOCUMENTS

| JP | 55-12429 | 1/1980 | ............. G01T/1/00 |
| JP | 55-116340 | 9/1980 | ............. A61B/6/00 |
| JP | 56-104645 | 8/1981 | ............. A61B/6/00 |
| JP | 1-101540 | 4/1989 | ............ G03B/42/02 |
| JP | 1-111568 | 4/1989 | ............. B62D/5/24 |
| JP | 1-236354 | 9/1989 | ............ G06F/15/20 |
| JP | 2000-178327 | 6/2000 | .......... C08F/299/08 |
| JP | 2000-217516 | 8/2000 | ............. A23G/3/00 |

OTHER PUBLICATIONS

Abstract 01–101540 Apr. 19, 1989.

* cited by examiner

Primary Examiner—Constantine Hannaher
Assistant Examiner—Timothy J. Moran
(74) Attorney, Agent, or Firm—Sughrue Mion, PLLC

(57) ABSTRACT

Initial image data having a pixel size smaller than a pixel size of a final image are obtained by using line sensors arranged in a main scan direction and a vertical scan direction, and the final image becomes of high quality by processing the initial image data to prevent the image from becoming uneven. Integration processing means carries out a first conversion process to convert the initial image data comprising signals detected by the line sensors into data for pixels divided in the main scan direction. The integration processing means carries out a second conversion process in which, whenever the data are obtained for three consecutive pixels in the main scan direction, the data are added to become data for one pixel of the final image. The data for the final image are then subjected to an equalization process such as dark current correction carried out by a correction means.

6 Claims, 4 Drawing Sheets

RADIATION IMAGE INFORMATION READING APPARATUS

BACKGROUND OF THE INVENTION

1. Field of the Invention

The present invention relates to a method and apparatus for reading radiation image information. More specifically, the present invention relates to a radiation image information reading apparatus for reading radiation image information recorded on a stimulable phosphor sheet by using a plurality of line sensors.

2. Description of the Related Art

Radiation image recording and reproducing systems using stimulable phosphor (see Japanese Unexamined Patent Publication Nos. 55(1980)-12429, 55 (1980)-116340, and 56 (1981)-104645, for example) have been in wide use. The stimulable phosphor stores a portion of energy of radiation irradiated thereon and emits light in accordance with the radiation energy stored therein upon exposure to an excitation light such as visible light and a laser beam. In such a system, radiation image information of a subject such as a human body is recorded on a stimulable phosphor sheet comprising a stimulable phosphor layer over a base material. By irradiating the excitation light such as a laser beam on each of the pixels on the sheet, light is emitted from the pixels. The light is photoelectrically read by photoelectric reading means to obtain an image signal, and an erasing light is irradiated on the sheet after the reading to release the radiation energy still remaining in the sheet.

Image processing such as tone processing and frequency processing appropriate for observation is carried out on the image signal obtained in the above manner, and the image signal after the processing is recorded on a film as a visible diagnostic image (a final image) or displayed on a high-definition CRT for diagnosis. By irradiating the erasing light on the sheet to release the residual energy, the sheet can be used repeatedly for recording radiation image information.

In a radiation image information reading apparatus used in the radiation image recording and reproducing system described above, a linear light source is used for linearly irradiating the excitation light on the sheet, in order to reduce time for reading the light, to downsize the apparatus, and to reduce cost (see Japanese Unexamined Patent Publication Nos. 60(1985)-111568, 60(1985)-236354, and 1(1989)-101540, for example). As the photoelectric reading means, a line sensor having a plurality of photoelectric conversion devices arranged in a lengthwise direction of an area in the sheet on which the excitation light is irradiated from the linear light source (hereinafter called a main scan direction) is used. The reading apparatus also comprises scanning means for moving either a combination of the linear light source and the line sensor or the stimulable phosphor sheet relative to the other in a direction substantially perpendicular to the main scan direction (hereinafter called a vertical scan direction).

Each of the photoelectric conversion devices such as a CCD sensor and a MOS image sensor comprising the line sensor has a limit called a saturation charge in terms of an amount of an electric charge to be stored therein. It is difficult to produce the sensor with a large surface area, and the sensor cannot detect light having an amount larger than a predetermined amount. As a result, an accurate measurement result is not obtained for a range in which an amount of the radiation information is large (a high dose range) in the sheet, and a range of the amount of the light readable by the sensor (a dynamic range) is narrow.

Therefore, a width of each of the photoelectric conversion devices in the vertical scan direction has been conventionally set several times smaller than a width of one pixel in the vertical scan direction in a final image. Data from several consecutive photoelectric conversion devices are read sequentially in the vertical scan direction and added to obtain data for one pixel in the final image. In this manner, the dynamic range of the line sensor can be widened.

However, in the above method, in order to add the data in the vertical scan direction, it is necessary to store, at least for each reading, all outputs from all the photoelectric conversion devices arranged in the main scan direction. Since the line sensor has the photoelectric conversion devices arranged in the main scan direction, a large-scale storage device (a line memory) is necessary to store all the outputs from each of the photoelectric conversion devices, which increases the cost.

Therefore, a radiation image information reading apparatus for solving this problem has been proposed (see Japanese Patent Application No. 2000-178327 filed by the assignee). In this apparatus, outputs from several (n) photoelectric conversion devices arranged consecutively in a lengthwise direction (the main scan direction) of a line sensor are added to comprise one pixel in a final image (this method is called pixel density conversion), instead of addition in the vertical scan direction. Therefore, each of the photoelectric conversion devices detects data whose amount is 1/nth of the amount of data for one pixel. In this manner, each of the photoelectric conversion devices can avoid reaching a saturation charge. By using such an apparatus, data can be read accurately in a range having high radiation energy stored on the sheet without using a large memory space, and a high-quality image can be obtained.

However, the length required for a line sensor used in the above radiation image information reading apparatus is approximately 35–43 cm, which is equivalent to the length of the stimulable phosphor sheet. However, due to a limitation in production, the length of the line sensor is several tens to 100 mm. Therefore, a plurality of line sensors are arranged in the direction of main scan to carry out reading. Since each of the line sensors are packaged, insensitive areas where the light is not received appear at joints of neighboring line sensors. Light emitted from an area in the sheet where the excitation light is irradiated is not detected in areas corresponding to the insensitive areas, and an artifact (false image) is created.

Therefore, a radiation image information reading apparatus for solving the above problem has been proposed (Japanese Patent Application No. 2000-217516 filed by the assignee). In this apparatus, a plurality of line sensors are arranged in the main scan direction and in the vertical scan direction, and the light emitted from the sheet is received by the photoelectric conversion devices of at least one of the line sensors. In this manner, the light can be received thoroughly.

Although an initial image comprising data each having a pixel size smaller than a pixel size of a final image is obtained by using the above apparatus, processing for converting the data is also necessary. In the processing, outputs from several lines of the line sensors in the vertical scan direction are converted into data for one line in the vertical scan direction, and pixel density conversion processing in accordance with the size of the final image is also carried out. When the processing for conversion into the data for one line is carried out on the outputs from the line sensors after the pixel density conversion processing is carried out thereon for each line in the vertical scan direction, the final image tends to become uneven. Therefore, a high quality final image cannot be obtained.

SUMMARY OF THE INVENTION

The present invention has been conceived based on consideration of the above problems. An object of the present invention is therefore to provide an apparatus enabling generation of a high quality image by preventing the image from becoming uneven. The apparatus has a plurality of line sensors arranged in a main scan direction and a vertical scan direction. The apparatus obtains an initial image comprising data having a pixel size smaller than a pixel size of a final image, and obtains the final image having the larger pixel size by processing the initial image data.

A radiation image information reading apparatus of the present invention comprises:

a linear light source for linearly emitting an excitation light to an area on a front side of a stimulating phosphor sheet having radiation image recorded therein;

detection means comprising a plurality of line sensors;

scanning means for relatively moving either a combination of the linear light source and the detection means or the sheet to the other;

reading means for obtaining initial image data; and integration processing means for carrying out a first conversion process and a second conversion process. Each of the line sensors of the detection means comprises a plurality of photoelectric conversion devices arranged in a lengthwise direction of the area in the sheet where the excitation light is irradiated linearly (hereinafter called the irradiation area) for carrying out photoelectric conversion by receiving light emitted from the irradiation area or from an area on a backside of the irradiation area of the sheet. The line sensors are placed in the lengthwise direction as well as in a direction perpendicular to the lengthwise direction so that the photoelectric conversion devices of at least one of the line sensors can receive the light. The scanning means causes either the combination of the linear light source and the detection means or the sheet to have movement relative to the other in a direction different from the lengthwise direction. The reading means obtains the initial image data by sequentially reading outputs from the photoelectric conversion devices of the detection means in accordance with the movement. The first conversion process carried out by the integration processing means is a process that generates pixel data corresponding to pixels divided in the lengthwise direction in the case where only one of the outputs in the initial image data is available for an area in the irradiation area, and to generate the pixel data corresponding to the pixels divided in the lengthwise direction by adding two or more of the outputs in the case where two or more of the outputs are available for an area in the irradiation area. The second conversion process carried out by the integration processing means is a process that generates data of a final image by adding the pixel data over a predetermined number of pixels consecutively lined in the lengthwise direction.

As the linear light source, a fluorescent lamp, a cold-cathode fluorescent lamp, an LED array or the like can be used. The linear light source itself may have a linear shape, as in the case of a fluorescent lamp or the like. Alternatively, the linear light source may cause the excitation light to be emitted linearly, and a broad area laser and the like can also be used. The excitation light emitted from the linear light source may be emitted continuously. Alternatively, the excitation light may be emitted continually as in the case of pulses generated by repeated emission and stoppage. In terms of noise reduction, a high-power pulsed light is preferred.

The direction in which the combination of the linear light source and the line sensors is moved relative to the sheet (the direction different from a lengthwise direction of the combination) is preferably a direction substantially perpendicular to the lengthwise direction of the combination, that is, a direction along a short axis thereof. However, the movement direction is not limited to the short-axis direction. For example, the movement direction may be oblique to the direction substantially perpendicular to the lengthwise direction of the linear light source and the line sensors as long as the excitation light can be irradiated substantially over the entire sheet. Alternatively, the movement may form a zigzag pattern.

The linear light source and the line sensors maybe located on the same side of the stimulable phosphor sheet or located separately on different sides of the sheet. However, in the case where the linear light source is placed on the side different from the side of the line sensors, a base material or the like of the stimulable phosphor sheet needs to be transparent to the light so that the light can reach the side opposite the side of excitation light irradiation.

As the photoelectric conversion devices comprising the line sensors, amorphous silicon sensors, CCD sensors, CCDs with back illuminators, and MOS image sensors can be used, for example.

As the stimulable phosphor sheet for recording the radiation image information, an ordinary stimulable phosphor sheet serving as phosphor for absorbing the radiation and as phosphor for storing the radiation energy (i.e. for recording the radiation image information) will suffice. However, a stimulable phosphor sheet proposed in Japanese Patent Application No. 11(1999)-372978 may be preferably included as the sheet to be read by the radiation image information reading apparatus of the present invention. This sheet separates the function of absorbing the radiation from the function of storing the radiation energy, unlike the conventional stimulable phosphor sheet. In this sheet, phosphor having excellent radiation absorption and phosphor having excellent responsiveness to light emitted by the absorption are used separately for absorbing the radiation and for recording the radiation image information. The phosphor having excellent radiation absorption (radiation absorption phosphor) is used for absorbing the radiation and causes ultraviolet to visible light to be emitted therefrom, and this light is absorbed by the phosphor having the excellent responsiveness to this light (recording phosphor) to store the energy thereof. The energy is released as the light upon exposure to the excitation light such as visible to infrared light, and the light emitted in this manner is photoelectrically read by photoelectric reading means. In this manner, radiation image information detection efficiency, that is, a radiation absorption ratio, a light emission efficiency, a light output efficiency, and the like can be improved. Therefore, it is preferable for the stimulable phosphor sheet used in the radiation image information reading apparatus of the present invention to include the recording phosphor.

The recording phosphor absorbs the ultraviolet to visible light emitted from the radiation absorption phosphor, and stores the energy as the radiation image information. Since the ultraviolet to visible light is emitted by absorption of the radiation by the radiation absorption phosphor, the radiation image information includes the image information recorded in the recording phosphor.

The term "initial image data" refers to signal data output from the photoelectric conversion devices and not subjected to the first conversion process and the second conversion process.

As a manner of arranging the line sensors comprising the detection means, it is preferable for the line sensors to be lined up in a main scan direction (a direction shown by an arrow X in FIG. 9A) without a gap between any two of the line sensors adjacent to each other. However, as shown in FIG. 9B, the line sensors may be arranged at intervals. In other words, any arrangement enabling the light from the irradiation area of the sheet to be received by a light reception area (an area in which the photoelectric conversion devices are located) of at least one of the line sensors can be used. In FIG. 9, the line sensors are arranged consecutively in a direction perpendicular to the main scan direction (a direction shown by an arrow Y) without a gap. However, the line sensors may be arranged separately, sandwiching the irradiation area.

In the present invention, the line sensors are lined in the main scan direction and the direction perpendicular to the main scan direction to obtain the initial image data by reading the outputs from the photoelectric conversion devices of the line sensors. The initial image data are converted (subjected to the first conversion process) into the pixel data for pixels divided in the main scan direction (whose size is smaller than a pixel size of the final image). The predetermined number of the pixel data are added (subjected to pixel density conversion) to obtain the pixel data of the final image (the second conversion process).

The first conversion process carried out on the initial image data comprising the outputs from the photoelectric conversion devices of the line sensors arranged in the main scan direction and in the direction perpendicular to the main scan direction is a process that converts the initial image data into the pixel data for one line of pixels in the main scan direction corresponding to a target area of initial image data reading, that is, to generate the pixel data corresponding to the irradiation area of the sheet. More specifically, in the case where only one of the outputs in the initial image data is available for an area in the irradiation area (that is, in the case where the light emitted from the area in the irradiation area is received by the photoelectric conversion devices of only one of the line sensors), the output is used to generate the pixel data corresponding to pixels divided in the main scan direction. However, in the case where the two or more of the outputs are available for an area in the irradiation area (that is, in the case where the light emitted from the area in the irradiation area is received by the photoelectric conversion devices of two or more of the line sensors), the outputs are added and converted into the pixel data corresponding to pixels divided in the main scan direction. For example, if a line sensor A, a line sensor B and a line sensor C are arranged as shown in FIG. 10, outputs from photoelectric conversion devices a1, a2, a3, . . . , b1, b2, b3, . . . , and c1, c2, c3, . . . of the line sensors are detected for an irradiation area of a stimulable phosphor sheet. The outputs comprise initial image data. For each of the areas in the irradiation area corresponding to the photoelectric conversion devices a1, a2, a3, and a4, the number of outputs is one. Likewise, for a5, a6, c5, c6, c7 and c8, the number of the outputs is also one due to insensitive areas (Wa, Wb and Wc) of the respective line sensors. Meanwhile, for each of areas in the irradiation area corresponding to the photoelectric conversion devices a7, a8, a9 and a10, the number of the outputs is not one. The outputs from the photoelectric conversion devices c1, c2, c3 and c4 are also available, which is the same for areas corresponding to the photoelectric conversion devices b1, b2, b3 and b4. In the first conversion process of the present invention, the outputs from the photoelectric conversion devices a1 to a6 and c5 to c8 are converted into pixel data corresponding to pixels divided in a main scan direction (a direction shown by an arrow X), and the outputs from pairs a7 and c1, a8 and c2, a9 and c3, a10 and c4, b1 and c9, b2 and c10, b3 and c11, and b4 and c12 are respectively added for each of the pairs to be used as the pixel data for each of pixels corresponding to positions of the respective pairs. As the addition process, simple addition, averaging, weighted operation, mask operation and the like can be used. When each of the outputs from only one of the photoelectric conversion devices is converted into the pixel data corresponding to each pixel, this conversion needs to be carried out in accordance with the addition process. In other words, if the addition process is simple addition for the case shown in FIG. 10, each of the outputs from the photoelectric conversion devices a1 to a6 and c5 to c8 is doubled to be used as the pixel data corresponding to each pixel. However, if the addition process is an averaging process, each of the outputs can be used as it is as the pixel data corresponding to each pixel.

The "second conversion process" refers to a process that generates the data for the final image by adding the pixel data having been subjected to the first conversion process for a predetermined number of pixels. This process may be simple addition or averaging. If necessary, the process can be a weighted operation or a mask operation. The "final image" refers to an image comprising the data that have been subjected to the first conversion process and the second conversion process. The final image comprising the digital data is provided to image processing means or image display means or image recording means, for example.

The second conversion means may be carried out after the first conversion process or concurrently with the first conversion process.

The radiation image information reading apparatus of the present invention preferably has an equalization processing means for correcting unevenness in the line sensors, the photoelectric conversion devices, and the excitation optical system and the reading optical system by carrying out an equalization process on the image data after the first conversion process and the second conversion process, in order to obtain a higher quality final image.

In order to improve image quality, it is preferable for the equalization means to carry out at least two processes from among the following: dark current correction processing (processing for correcting the image data so as to eliminate an effect of signals output from the photoelectric conversion devices when no light enters the devices), sensitivity correction processing (processing for correcting uneven sensitivity of the photoelectric conversion devices), linearity correction processing, and shading correction processing for correcting shading affected by unevenness in the excitation light or in the reading optical system.

According to the radiation image information reading apparatus of the present invention, the line sensors are arranged in the main scan direction and in the direction perpendicular to the main scan direction so that the light emitted from the irradiation area of the sheet is received by the photoelectric conversion devices in at least one of the line sensors. The initial image data comprising the outputs from the photoelectric conversion devices in the line sensors are subjected to the first conversion process to generate the pixel data corresponding to the pixels divided in the main scan direction by carrying out the addition process on two or more of the outputs from the same area if the two or more of the outputs are available for the area. The pixel data corresponding to respective pixels are then subjected to the pixel density conversion process (the second conversion process) to generate the data of the final image. Therefore, problems such as undetectable areas caused by insensitive areas of the line sensors are solved while a dynamic range of the apparatus is widened. In this manner, image quality degradation such as unevenness in the final image after the pixel density conversion process can be prevented.

The second conversion process may be carried out after or concurrently with the first conversion processing on the initial image data.

If the equalization means for carrying out the equalization processing on the image data after the first conversion process and the second conversion process is used for the radiation image information reading apparatus, the quality of the final image can be improved. Especially, the quality can be improved with certainty by carrying out at least two processes from among the following: dark current correction processing, sensitivity correction processing, linearity correction processing and shading correction processing.

The equalization process is carried out on the data after the first conversion process and the second conversion process which have comparatively fewer pixels and thus a smaller data amount. Therefore, memory space for data storage can be saved and an operation load for the equalization process can be reduced.

DESCRIPTION OF THE PREFERRED EMBODIMENTS

Hereinafter, embodiments of a radiation image information reading apparatus of the present invention will be explained with reference to the accompanying drawings.

Figure 1:
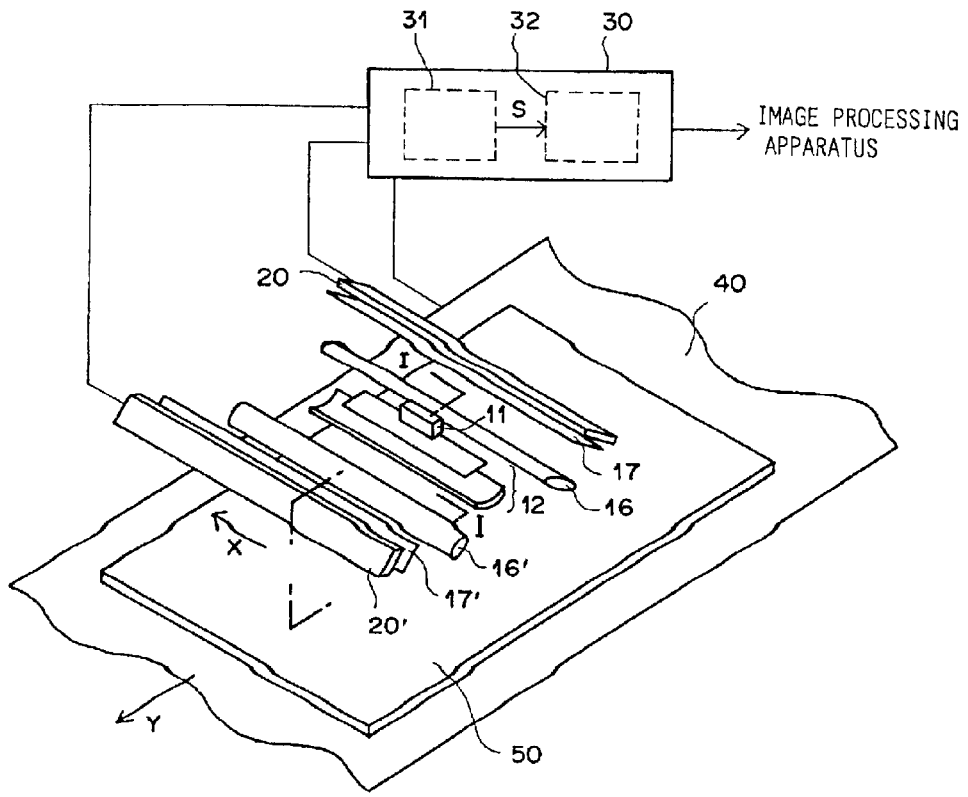
FIG. 1 is a diagram showing a configuration of a first embodiment of a radiation image information reading apparatus of the present invention.
Figure 2:
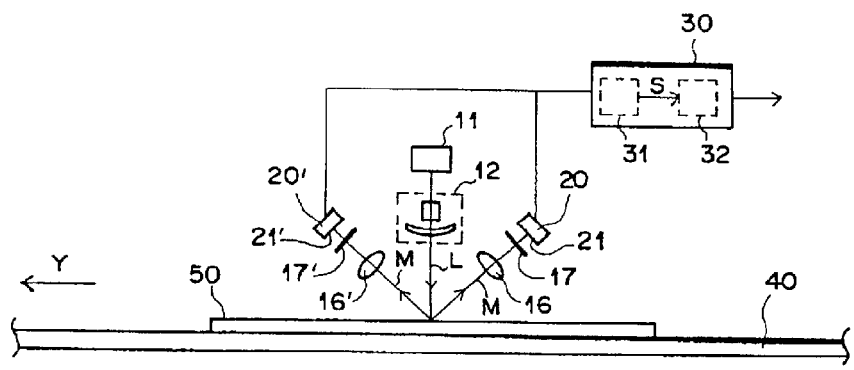
FIG. 2 is a diagram showing a cross-sectional view along a line I—I in FIG. 1 of the radiation image information reading apparatus shown in FIG. 1.
Figure 3:
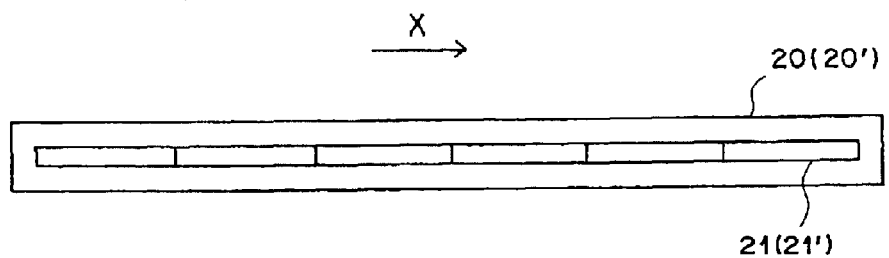
FIG. 3 is a diagram showing a line detection unit of the radiation image information reading apparatus shown in FIGS. 1 and 2.

FIG. 1 is a perspective view of an embodiment of the radiation image information reading apparatus of the present invention, and FIG. 2 is across-sectional view of the apparatus cut by a line I—I in FIG. 1. FIG. 3 shows a detailed configuration of a line detection unit 20 of the apparatus.

The radiation image information reading apparatus of the present invention comprises a scanning belt 40 for conveying a stimulable phosphor sheet 50 recording radiation image information therein (hereinafter simply called the stimulable phosphor sheet 50) in a direction shown by an arrow Y, a broad area laser (hereinafter called BLD) 11 for emitting a secondary linear excitation light L (hereinafter simply called the excitation light L) perpendicularly to the sheet 50, an optical system 12 for irradiating the linear excitation light L on the sheet 50 and comprising a collimator lens for collimating the excitation light L emitted from the BLD 11 and a toric lens for expanding the beam in only one direction, lens arrays 16 and 16' having a continuous refractive-index distribution (each of the lens arrays comprises a plurality of continuous refractive-index distribution lenses and hereinafter is called the Selfoc lens array) for causing light M emitted from the sheet 50 in accordance with the radiation image information upon exposure to the excitation light L to become parallel so that the light is detected by line detection units 20 and 20', excitation light cutting filters 17 and 17' for letting only the light M pass by cutting the excitation light L reflected on a surface of the sheet 50 and mixed with the light M from the Selfoc lens arrays 16 and 16', the line detection units 20 and 20' for carrying out photoelectric conversion by receiving the light M that has passed through the excitation light cutting filters 17 and 17', and image information reading means 30 for reading signals output from the line detection units 20 and 20'.

In the above configuration, the Selfoc lens arrays 16 and 16' and the excitation light cutting filters 17 and 17' are placed in such a manner that the line detection units 20 and 20' can receive the light M.

Figure 5:
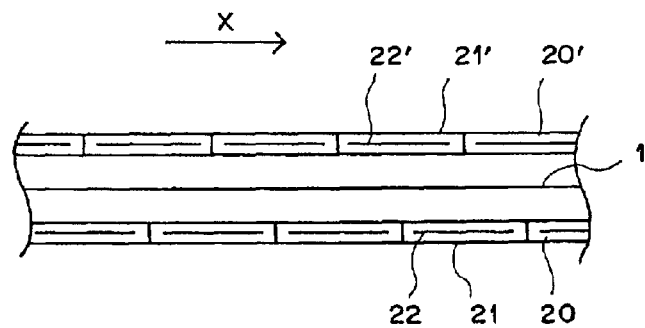
FIG. 5 is a cross-sectional view of an upper portion of the radiation image information reading apparatus.

The line detection units 20 and 20' are, as shown in FIG. 5, placed in such a manner that joint areas of line sensors 21 in the line detection unit 20 are located at positions different from joint areas of line sensors 21' of the line detection area 20' when viewed from an excitation light irradiation area 1.

The Selfoc lens arrays 16 and 16' cause an image represented by the light M to be formed in the same size on light receiving surfaces of the respective light detection units.

The optical system 12 comprising the collimator lens and the toric lens expands the excitation light L from the BLD 11 so that the ray is irradiated on a desired irradiation area of the sheet 50.

Figure 4:
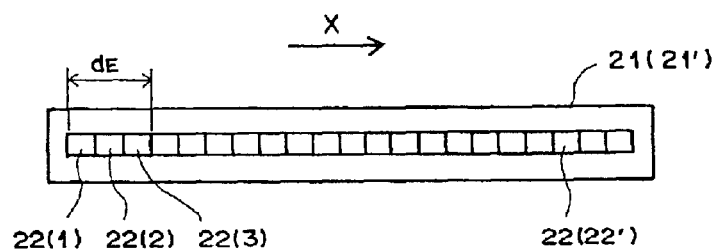
FIG. 4 shows the line detection unit shown in FIG. 3 in detail.

As shown in FIGS. 3 and 4, in the line detection units 20 and 20', the line sensors 21 and 21' each having a plurality of photoelectric conversion devices 22 or 22' (1000 or more, for example) arranged along a line in a direction shown by an arrow X. More specifically, amorphous silicon sensors, CCD sensors, or MOS imaging sensors can be used as the photoelectric conversion devices.

The image information reading means 30 comprises integration processing means 31 for converting the signals read by the line detection units 20 and 20' into pixel data and for obtaining data S by adding the pixel data for every 3 consecutive pixels in a main scan direction (shown by the arrow X), and correction means 32 for carrying out equalization processing on the data S.

The line detection units 20 and 20' are preferably arranged as perpendicularly as possible to the irradiation area of the sheet 50.

The excitation light L is not necessarily irradiated perpendicularly to the stimulable phosphor sheet as in this embodiment. However, it is preferable for the optical system and the line detection units in that case to be placed in consideration of light collection efficiency.

In this embodiment, the number of the line detection units is two. However, if the number of the line detection units used in the apparatus is three or more, it is preferable for the line detection units to be placed in such a manner that the excitation light L passes a widest interval between the line detection units.

Operation of the radiation image information reading apparatus will be explained next.

The scanning belt 40 conveys the stimulable phosphor sheet 50 recording the radiation image information therein in the direction shown by the arrow Y, while moving to the direction of the arrow Y. The sheet 50 is conveyed at the same speed as the belt 40, and this speed is input to the image information reading means 30.

Meanwhile, the BLD 11 irradiates the linear excitation light L perpendicularly to the sheet 50, and the excitation light L is made to be a parallel beam by the optical system 12 comprising the collimator lens and the toric lens on a path of the ray. The excitation light L is linearly irradiated on the sheet 50 substantially perpendicular to a line in the direction X.

The linear excitation light L that has reached the sheet 50 excites stimulable phosphor along the path thereof, and enters the interior of the sheet 50. The excitation light L is diffused around the path, exciting the stimulable phosphor around the path. As a result, the light M is emitted from and around the path on the sheet 50, in accordance with the radiation image information stored in the sheet. The Selfoc lenses 16 and 16' cause the light M to become parallel and the photoelectric conversion devices 22 and 22' of the line detection units 20 and 20' detect the light. At this time, the excitation light L reflected on the surface of the sheet 50 and mixed with the light M that has passed through the Selfoc lenses 16 and 16' is cut by the excitation light cutting filters 17 and 17'. Therefore, the excitation light L does not reach the line detection units. The line detection units 20 and 20' carry out photoelectric conversion on the light M detected by the photoelectric conversion devices 22 and 22', and outputs the signals to the image information reading means 30.

As shown in FIG. 5, in the line detection units 20 and 20', the joint areas (insensitive areas) of the line sensors 21 in the line detection unit 20 are located at positions different from positions of the joint areas of the line sensors 21' in the detection unit 20' when viewed from the irradiation area. Therefore, the light M emitted from areas in the irradiation area corresponding to the joint areas of the line sensors 21 in the line detection unit 20 is received by the line sensors 21' in the line detection unit 20' while the light M emitted from areas in the irradiation area corresponding to the joint areas of the line sensors 21' in the line detection unit 20' is received by the line sensors 21 in the line detection unit 20. Meanwhile, the light M emitted from areas in the irradiation area corresponding to the line detection units 20 and 20' excluding the joint areas thereof can be received by the line detection units 20 and 20'.

The light M received by the line detection units 20 and 20' is subjected to the photoelectric conversion and output to the image information reading means 30. The image information reading means 30 receives initial image data comprising the image signals. The integration processing means 31 converts the initial image data into the pixel data corresponding to the pixels divided in the direction of the arrow X (the main scan direction), and adds the pixel data for three consecutive pixels in the main scan direction. The image data S after the pixel density conversion processing obtained in the above manner are output to the correction means 32. The correction means 32 carries out the equalization processing such as dark current correction, sensitivity correction, linearity correction, and shading correction on the image data S, and outputs the processed data to an image processing apparatus. As shown in FIG. 4, since a range in which each of the photoelectric conversion devices 22 (or 22') in the line sensor 21 (or 21') can receive the light M in the direction of X is only ⅓ of a width dE Of one pixel in the direction of X in a final image, each of the photoelectric conversion devices 22 (or 22') can receive comparatively small amount of light, avoiding charge saturation.

Figure 6:
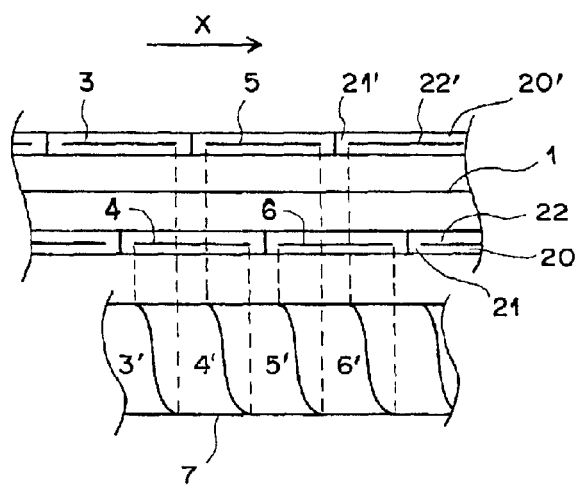
FIG. 6 is a diagram showing an example of how an addition ratio applied to data detected by the apparatus is changed.

The integration processing means 31 carries out the conversion of the initial image data into the pixel data and the pixel density conversion processing at the same time. More specifically, the integration processing means obtains the pixel data by addition using a continuously changing addition ratio for the image signals output respectively from the line detection units. Every time the pixel data for three consecutive pixels in the direction of X are obtained, the pixel data are added to comprise the image data S for one pixel. The addition process for converting the initial image data into the pixel data and the addition process for converting the pixel density is carried out alternately to obtain the image data S. FIG. 6 shows an example of how the addition ratio changes when the initial image data are converted into the pixel data. In the case where a line sensor 3 and a line sensor 4 in the two line detection units 20 and 20' detect the light M from the irradiation area, an image signal 3' detected by the line sensor 3 and an image signal 4' detected by the line sensor 4 are added by using the addition ratio changing consecutively, as shown by FIG. 6. Addition by using the consecutively changing addition ratio refers to addition of the signals while changing the addition ratio of the signal 3' to the signal 4' to 9:1, 8:2, and 7:3 if 10:0 refers to the addition ratio in the case of detecting the signal 3' only by the line sensor 3. By carrying out this addition, the integration processing means generates the data for one pixel in the final image whenever the data for three consecutive pixels are obtained.

The data S of the final image are output to the correction means 32 and the correction processing is carried out thereon. The data are stored in a memory corresponding to each of the areas, with the signals accumulated therein, and output as the image information to the image processing apparatus.

The operation of the scanning belt 40 and the detection of the light M are repeatedly carried out, and the image signals based on the light M from the entire sheet 50 are output to the image processing apparatus.

The radiation image information reading apparatus in this embodiment comprises the line detection units, and the light M emitted from the areas in the irradiation area corresponding to the joint areas of the line sensors in one of the detection units is detected by the remaining line detection unit having the line sensors whose joint areas are arranged at positions having a predetermined distance from the joint areas of its counterpart. In this manner, the light M emitted from the irradiation area of the sheet is detected with certainty, and an artifact can be prevented from occurring. Furthermore, each of the photoelectric conversion devices represents ⅓ of the data for one pixel in the final image, which can prevent charge saturation. As a result, the data can be read accurately even from an area in the sheet where high radiation energy is stored, and the final image can be of high quality. In this apparatus, the integration processing means carries out the first conversion on the signals detected by the line detection units to convert the signals into the pixel data corresponding to the pixels divided in the main scan direction, and then carries out the second conversion process to generate the final image data S by adding the pixel data for a predetermined number of pixels (3 in this embodiment). Therefore, quality degradation of the final image such as unevenness can be prevented while the dynamic range of the reading apparatus is widened.

The radiation image information reading apparatus in this embodiment comprises the correction means 32, and the correction means 32 carries out the equalization processing such as the dark current correction, the sensitivity correction, the linearity correction, and the shading correction on the image data S having been converted into pixel data by the conversion process and subjected to the pixel density conversion process by the integration processing means 31. Therefore, the final image can become of higher quality. Furthermore, the correction means 32 carries out the correction process on the image data S having been subjected to the processing by the integration processing means 31. Therefore, an amount of the data S to be processed by the correction means 32 becomes smaller than an amount of the initial image data. As a result, the correction process can be carried out fast even if a speed of a circuit for the correction process is not increased, and the memory space for storing the data can be saved.

Figure 7:
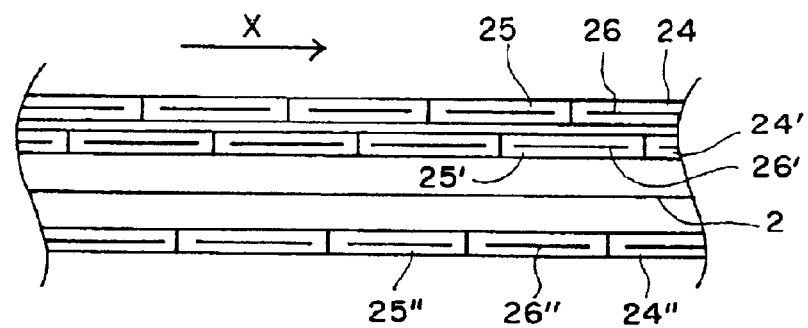
FIG. 7 is a cross-sectional view of an upper portion of another embodiment of the radiation image information reading apparatus of the present invention.

In this embodiment, the two line detection units 20 and 20' detect the light. However, the number of the line detection units to detect the light M may be three or more. For example, the detection units can be configured as shown in FIG. 7. Joint areas of line sensors 25, 25' and 25" in line detection units 24, 24', and 24" are located at different positions when viewed from the irradiation area. Therefore, the light emitted from areas in the irradiation area of the sheet corresponding to the joint areas in any one of the line detection units is received by the remaining line detection units. The light emitted from areas in the irradiation area other than that which corresponds to the joint areas can be received by the three line detection units. The process of conversion into the pixel data and the pixel density conversion processing is carried out on signals detected in the above manner. The correction process is then carried out. In this manner, the same effect as by the radiation image information reading apparatus shown in FIG. 1 can be obtained.

In the radiation image information reading apparatus shown in FIG. 1, the integration processing means 31 adds the initial image data detected by the photoelectric conversion devices 22 and 22' in the line detection units 20 and 20' by using the continuously changing addition ratio, as shown in FIG. 6. In this manner, the data obtained for the insensitive areas corresponding to the joint areas can be prevented from becoming discontinuous, and the final image can be smoother with a suppressed artifact. However, the process (first conversion process) is not limited to this example, and addition, averaging, weighted addition, and the like can be used.

In the radiation image information reading apparatus in this embodiment, the integration processing means 31 carries out the addition process (the first conversion process) for converting the initial image data into the pixel data and the addition process for converting pixel density (the second conversion process) alternately (at the same time) in order to increase processing speed. However, the initial image data may all be converted into the pixel data and the pixel density conversion processing may be carried out thereafter.

In the radiation image information reading apparatus, the width of each of the photoelectric conversion devices (the width of one pixel for the data converted from the initial image data) in a lengthwise direction of the line detection units is set to ⅓ of one pixel in the final image. However, the width can be 1/n as desired, in accordance with an amount of the radiation energy stored in the stimulable phosphor sheet 50 (n is an integer equal to or larger than 2).

The radiation image information reading apparatus of the present invention is not limited to the embodiment described above. Any known configurations can be adopted for the light source, the optical system for focusing light located between the sheet and the light source, the optical systems between the sheet and the line sensors, and the line sensors, for example. Furthermore, the image processing apparatus for carrying out processing on the signals output from the image information reading apparatus or erasing means for releasing the radiation energy remaining on the sheet after excitation can also be adopted for the radiation image information reading apparatus.

In the radiation image information reading apparatus described above, the two optical systems and the two line detection units are placed on the same side of the sheet. However, as shown in FIG. 8, the two optical systems and the two detection units can be placed separately on different sides of the sheet.

Figure 8:
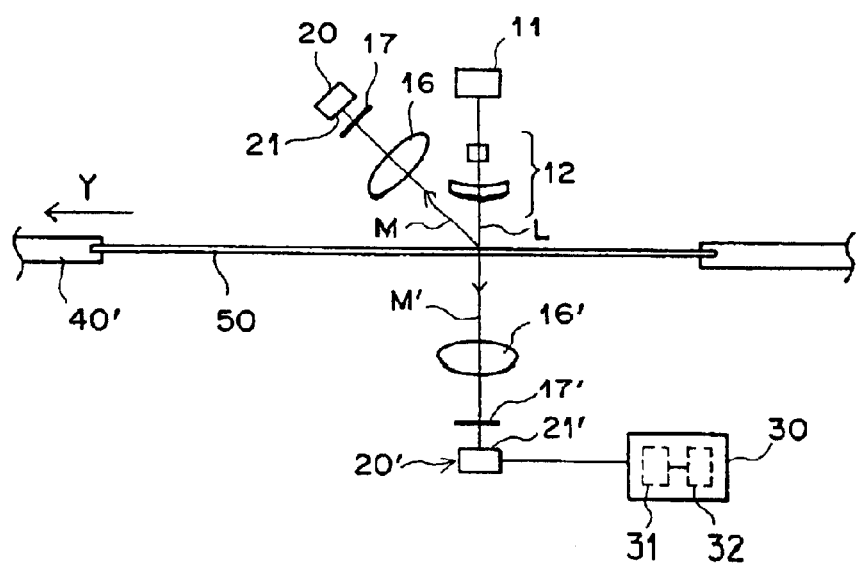
FIG. 8 is a cross-sectional view of an upper portion of still another embodiment of the radiation image information reading apparatus of the present invention.
Figure 9A:
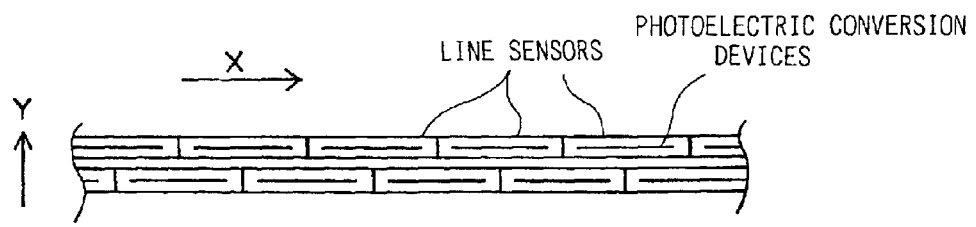
FIGS. 9A and 9B are diagrams showing how line sensors are arranged in the radiation image information reading apparatus of the present invention.
Figure 9B:
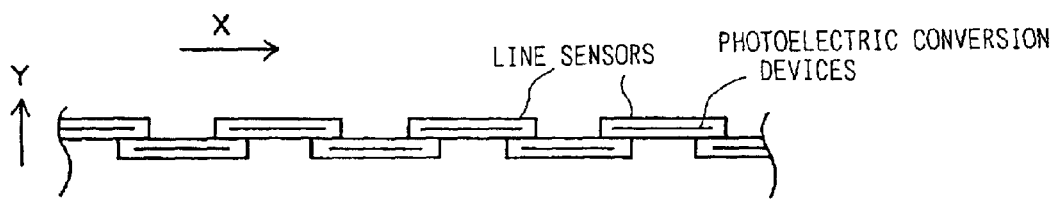
Figure 10:
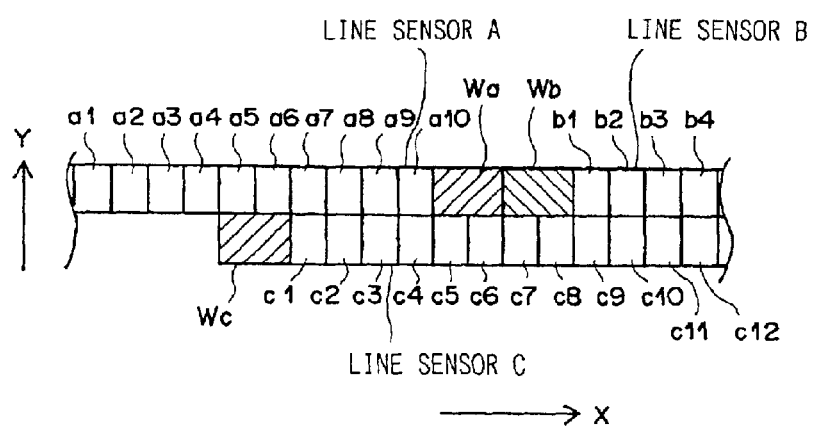
FIG. 10 is a diagram for explaining first conversion processing and second conversion processing carried out in the radiation image information reading apparatus of the present invention.

A radiation image information reading apparatus shown in FIG. 8 comprises a conveyer belt 40' for conveying a stimulable phosphor sheet 50 in a direction shown by an arrow Y while supporting a front end and a rear end of the sheet (areas where radiation information is either not recorded or not of interest), a BLD 11 for emitting a linear excitation light L substantially perpendicular to the sheet 50, an optical system 12 for irradiating the linear excitation light L on the sheet 50 placed on the belt 40' by using a collimator lens for collimating the linear excitation light L emitted from the BLD 11 and a toric lens for expanding the light L only in one direction, a Selfoc lens array 16 for causing light M emitted from a front side of the sheet 50 upon exposure to the excitation light L to become parallel to be detected by a line detection unit 20, a Selfoc lens array 16' having an optical axis substantially perpendicular to the sheet 50 and for causing light M' emitted from a backside of the sheet 50 (a surface opposite to a plane of incidence of the excitation light L) and having passed through the sheet 50 upon exposure to the excitation light L to be detected by a line detection unit 20', excitation light cutting filters 17 and 17' for respectively cutting the excitation light L entering the Selfoc lens arrays 16 and 16' in mixture with the light M and M', the line detection units 20 and 20' for receiving the light M and M' having passed through the filters 17 and 17' and for carrying out photoelectric conversion of the light M and M', and image information reading means 30 for reading signals output from line sensors 21 and 21' comprising the line detection units 20 and 20' and for outputting the signals to an image processing apparatus. The image information reading means 30 comprises integration processing means 31 for converting the signals read by the line detection units 20 and 20' into pixel data and for obtaining data S by adding the pixel data for 3 consecutive pixels lined in a main scan direction (a direction shown by an arrow X), and correction means 32 for carrying out equalization processing on the data S.

Operation of the radiation image information reading apparatus in this embodiment will be explained next.

The sheet 50 recording the radiation image information therein is conveyed by movement of the conveyer belt 40' in the direction of the arrow Y. The sheet 50 is conveyed at the same speed as the movement of the conveyer belt 40', and the speed is input to the image information reading means 30.

The BLD 11 emits the linear excitation light L substantially perpendicular to the sheet 50, and said light is made to become a parallel beam by the optical system 12 comprising the collimator lens and the toric lens on a path of said light. The excitation light is irradiated substantially perpendicular to the sheet 50. The excitation light L is irradiated on a linear irradiation area of the sheet in the direction of X.

Upon exposure to the excitation light L, the light M is emitted from and around the irradiation area of the sheet 50 in accordance with the radiation image information recorded therein. At the same time, the light M' having passed through a transparent base material of the sheet 50 is emitted from the backside of the sheet 50.

The light M from the front side of the sheet 50 enters the Selfoc lens array 16 and then passes through the filter 17 to eliminate the excitation light L mixed therein. The light M is detected by the line sensors 21 in the line detection unit 20.

The light M' emitted from the backside of the sheet 50 enters the Selfoc lens array 16' and then passes through the filter 17' to eliminate the excitation light L mixed therein.

The light M' is detected by the line sensors 21' in the line detection unit 20'.

Since the line sensors 21 and 21' operate in the same manner as in the radiation image information reading apparatus described in the above embodiment, explanation thereof is omitted. The same effect as by the radiation image information reading apparatus shown in FIG. 1 can be obtained by the radiation image information reading apparatus having the configuration shown in FIG. 8.

As the stimulable phosphor sheet used for the radiation image information reading apparatus shown in FIG. 8, a stimulable phosphor sheet for radiation energy subtraction may be used. This stimulable phosphor sheet records two sets of radiation image information for one subject and the two sets have different radiation energy absorption characteristics.

The light is emitted from the front side and the backside of the sheet in accordance with the image information recorded therein. At the same time, the line detection units may be placed separately on different sides of the sheet and the reading means may carry out subtraction processing on the image information read from both sides of the sheet while correlating pixels on both sides. In this case, as the line detection units placed separately on both sides of the sheet, line detection units in which photoelectric conversion devices are arranged in the lengthwise direction to occupy an entire sheet width can be used.

As the stimulable phosphor sheet for radiation energy subtraction, a so-called anisotropic stimulable phosphor sheet can be used. The anisotropic stimulable phosphor sheet has a configuration in which a plurality of minute cells are formed by an excitation light reflecting partition material extended in a direction of thickness of the sheet, for example.

For the radiation image information reading apparatus of the present invention, a stimulable phosphor sheet including stimulable phosphor enabling storage of energy of ultraviolet to visible light by absorption of the light and enabling release of the energy as the light to be detected upon exposure to visible to infrared light can be used.

What is claimed is:

1. A radiation image information reading apparatus comprising:

a linear light source for linearly emitting an excitation light to an area on a front side of a stimulating phosphor sheet having radiation image recorded therein;

detection means comprising a plurality of line sensors, each of the line sensors comprising a plurality of photoelectric conversion devices arranged in a lengthwise direction of the area in the sheet where the excitation light is linearly irradiated for carrying out photoelectric conversion by receiving light emitted from the area on the front side of the sheet or from an area on the backside of the sheet corresponding to the area on the front side, the line sensors being placed in the lengthwise direction as well as in a direction perpendicular to the lengthwise direction so that the photoelectric conversion devices of at least one of the line sensors can receive the light;

scanning means for causing either a combination of the linear light source and the detection means or the sheet to have movement relative to the other in a direction different from the lengthwise direction;

reading means for obtaining initial image data by sequentially reading outputs from the photoelectric conversion devices of the detection means in accordance with the movement; and integration processing means for carrying out a first conversion process to generate data corresponding to pixels located in areas where only one pixel output is available for a particular area which is irradiated by the excitation light, and to generate data corresponding to pixels located in areas where two or more pixel outputs are available for a particular area which is irradiated by the excitation light by adding two or more of the outputs and for carrying out a second conversion process to generate data of a final image by combining the pixel data arranged over a predetermined number of pixels consecutively lined in a lengthwise direction.

2. A radiation image information reading apparatus as defined in claim 1, wherein the integration processing means carries out the second conversion process after carrying out the first conversion process.

3. A radiation image information reading apparatus as defined in claim 1, wherein the integration processing means carries out the first conversion process and the second conversion process concurrently.

4. A radiation image information reading apparatus as defined in any of claims 1 to 3, further comprising equalization processing means for carrying out an equalization process on the data that have been processed by the integration processing means.

5. A radiation image information reading apparatus as defined in claim 4, wherein the equalization processing means carries out at least two correction processes from among the following: dark current correction processing, sensitivity correction processing, linearity correction processing, and shading correction processing.

6. A radiation image information reading apparatus comprising:

a linear light source for emitting excitation light to an area of a phosphor sheet having a radiation image recorded therein;

detection means comprising a plurality of line sensors each comprising
- a plurality of photoelectric conversion devices arranged in a lengthwise direction;
- the photoelectric conversion devices of the line sensors arranged such that the photoelectric conversion devices of one line sensor are staggered with those of another line sensor, so that the photoelectric conversion devices of at least one of the plurality of line sensors can receive light emitted from the area of the phosphor sheet stimulated with excitation light;

scanning means for causing either a combination of the linear light source and the detection means or the sheet to have movement relative to the other in a direction different form the lengthwise direction;

reading means for obtaining initial image data by sequentially reading outputs from the photoelectric conversion devices of the detection means in accordance with the movement; and integration processing means for carrying out a first conversion process to generate data corresponding to pixels located in areas where output from the pixels is received by only one photoelectric device and to generate data corresponding to pixels located in areas where output from the pixels is received by two or more photoelectric conversion device by adding the outputs received by two or more of the photoelectric conversion devices and for carrying out a second conversion process to generate data of a final image by combining the pixel data from a predetermined number of pixels lined in the lengthwise direction.

* * * * *